US011567908B1

(12) United States Patent
Cline et al.

(10) Patent No.: US 11,567,908 B1
(45) Date of Patent: Jan. 31, 2023

(54) VIRTUAL STORAGE INTERFACE

(71) Applicants: Van Cline, Aubrey, TX (US); Steven Wheelis, Plano, TX (US); Shailesh Mishra, Frisco, TX (US); Vera Kan, Plano, TX (US); Lior Sharon, Frisco, TX (US)

(72) Inventors: Van Cline, Aubrey, TX (US); Steven Wheelis, Plano, TX (US); Shailesh Mishra, Frisco, TX (US); Vera Kan, Plano, TX (US); Lior Sharon, Frisco, TX (US)

(73) Assignee: Intuit Inc.

( * ) Notice: Subject to any disclaimer, the term of this patent is extended or adjusted under 35 U.S.C. 154(b) by 1045 days.

(21) Appl. No.: 15/925,280

(22) Filed: Mar. 19, 2018

(51) Int. Cl.
  *G06F 16/188* (2019.01)
  *G06Q 40/00* (2012.01)
  *G06F 3/06* (2006.01)
  *G06F 16/93* (2019.01)

(52) U.S. Cl.
  CPC .......... *G06F 16/192* (2019.01); *G06F 3/0667* (2013.01); *G06F 16/93* (2019.01); *G06Q 40/12* (2013.12)

(58) Field of Classification Search
  CPC ...... G06F 16/192; G06F 16/93; G06F 3/0667; G06Q 40/12
  USPC .................................................. 707/822–831
  See application file for complete search history.

(56) References Cited

U.S. PATENT DOCUMENTS

| | | | | |
|---|---|---|---|---|
| 2004/0215600 | A1* | 10/2004 | Aridor | G06F 16/986 |
| 2013/0297614 | A1* | 11/2013 | Leinberg | G06F 16/14 707/741 |
| 2014/0114823 | A1* | 4/2014 | Pai | G06Q 40/123 705/31 |
| 2016/0246816 | A1* | 8/2016 | Abi | G06F 16/192 |

\* cited by examiner

*Primary Examiner* — Apu M Mofiz
*Assistant Examiner* — Husam Turki Samara
(74) *Attorney, Agent, or Firm* — Ferguson Braswell Fraser Kubasta PC

(57) ABSTRACT

Generating a storage interface includes receiving a request for documents, detecting an accounting workflow type corresponding to request, and identifying a document organizational structure matching the accounting workflow type. Further, a virtual storage interface is built using an index on the documents and according to the document organizational structure, and presented.

20 Claims, 10 Drawing Sheets

VIRTUAL STORAGE INTERFACE

BACKGROUND

Computing systems provide various computing functionality for users. One example of the functionality is in the storage and manipulation of files. At the hardware level, each document is partitioned into segments and each segment is stored into contiguous regions of a physical storage device. The operating system hides the hardware locations of the storage of documents by showing a file system interface. The file system interface is a static hierarchy of documents. The operating system stores specific identifiers of each folder and the contents of each folder in the hierarchy.

SUMMARY

In general, in one aspect, one or more embodiments relate to a method for a storage interface. The method includes receiving a request for documents, detecting an accounting workflow type corresponding to the request, and identifying a document organizational structure matching the accounting workflow type. The method further includes building a virtual storage interface using an index on the documents and according to the document organizational structure, and presenting the virtual storage interface.

In general, in one aspect, one or more embodiments relate to a system that includes a storage repository for storing documents, and at least one computer processor for executing a document manager. The document manager communicatively connected to the storage repository and configured to receive a request for the documents in the storage repository, detect an accounting workflow type corresponding to the request, and identify a document organizational structure matching the accounting workflow type. The document manager is further configured to build a virtual storage interface using an index on the documents and according to the first document organizational structure, and present the virtual storage interface.

In general, in one aspect, one or more embodiments relate to a non-transitory computer readable medium that includes computer readable program code for a storage interface. The computer readable program code is for receiving a request for documents, detecting an accounting workflow type corresponding to the request, identifying a document organizational structure matching the accounting workflow type, and building a virtual storage interface using an index on the documents and according to the document organizational structure. The computer readable program code is further for presenting the virtual storage interface.

Other aspects of the invention will be apparent from the following description and the appended claims.

DETAILED DESCRIPTION

Figure 1:
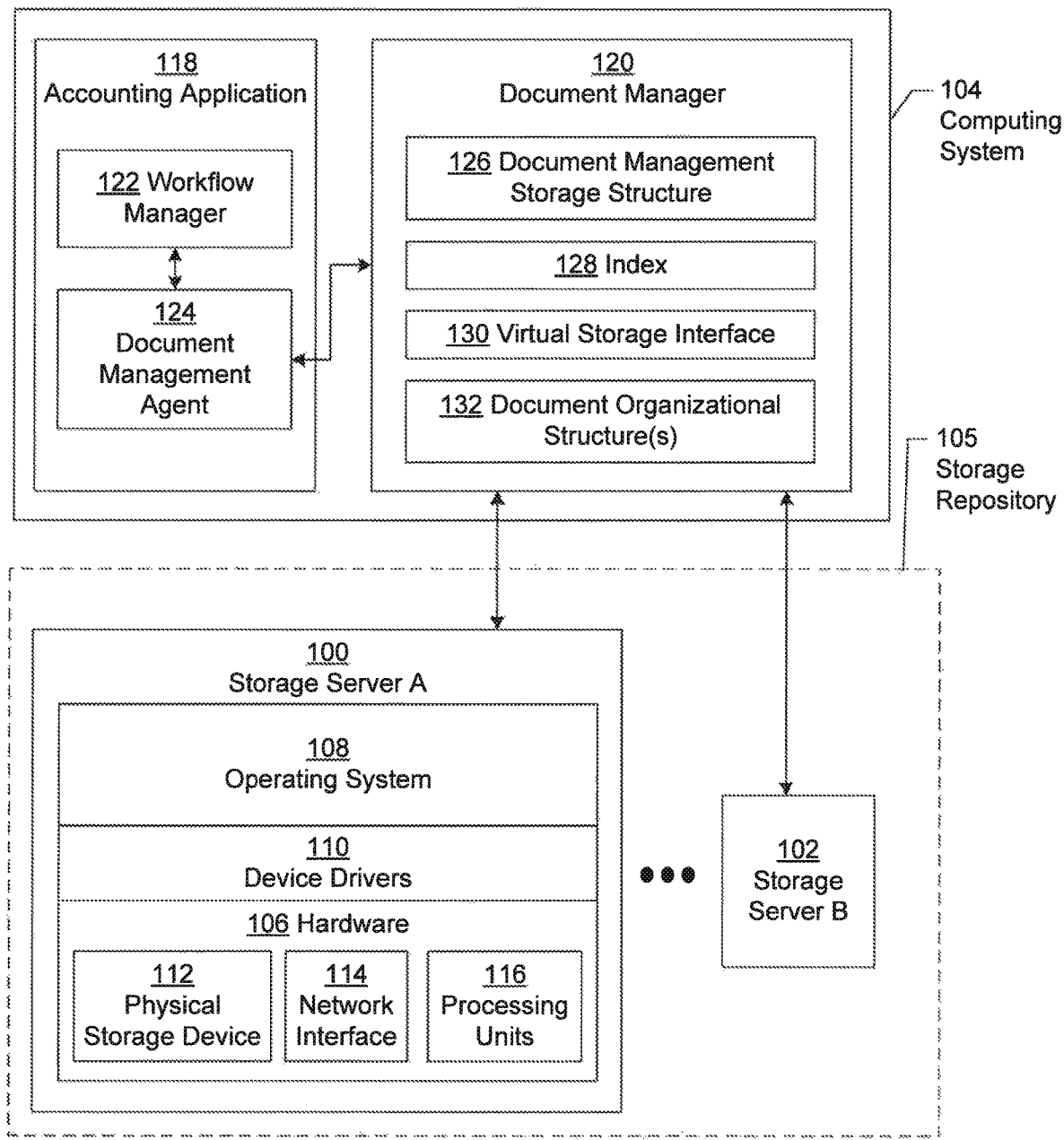
FIGS. 1, 2, and 3 show diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to providing an interface for large volumes of documents. With the manner in which documents are stored and statically referenced in computing systems, computing systems present a static view of documents that does not change without user or external intervention. For example, for database documents, query may be executed, and a user is presented with a simple list of documents matching the query. For file system documents, the hierarchy of the file system is static because of the manner in which the documents are referenced in the operating system. However, with the different workflows that a user may perform using a computing system, different storage structure views may be beneficial depending on the workflow. One or more embodiments address the technical limitations of the computing system storage to allow the computing system to create a virtual storage interface that matches the workflow. By changing the storage of documents, one or more embodiments correct for the technical limitations of the storage interface of a computing system.

Specifically, embodiments build a virtual storage interface that matches a current workflow being used. The virtual storage interface may change between workflows. Thus, when a request is received for documents, the workflow type of the workflow in which the request is received is identified. The document organizational structure matching the workflow type is identified. Using an index on the documents and according to the document organizational structure, the virtual storage interface is built and presented. The presentation provides a technique for users to view documents that are relevant.

FIG. 1 shows a diagram of a system in accordance with one or more embodiments of the invention. As shown in FIG. 1, the system includes storage servers (e.g., storage server A (100), storage server B (102)) and a computing system (104). The storage servers form a storage repository (105) for documents. In general, a storage repository (105) is a physical or virtual storage structure. If the storage repository (105) is virtual, the storage repository (105) may be stored on underlying physical hardware.

A storage server (e.g., storage server A (100), storage server B (102)) is a server that is configured to store documents. Specifically, a storage server is a server configured to store, access, secure and manage various files having documents. Storage servers may be configured to receive request for documents or information about documents, and transmit a response to the request. As shown in example storage server A, the storage server may have hardware (106), an operating system (108), and device drivers (110). The hardware (106) is the physical components of the storage server. For example, the hardware (106) may include the physical storage device (112), a network interface (114), and processing units (116). The physical storage device (112) is the physical device, such as solid state devices, flash memory, disks, etc., that stores the documents. The network interface (114) is a hardware interface for communicating with the network. Processing units (116) is circuitry configured to process information. The hardware (106) may provide a first level of abstraction of the actual storage location(s) on the physical storage device (112) of each document. Further, the hardware may be virtualized, for example, if the storage server is a virtual machine.

Continuing with FIG. 1, the operating system (108) provides an execution environment for the software on the storage server (e.g., storage server A (100)). The operating system (108) may provide a second level of abstraction of the storage of the documents. Specifically, the operating system (108) may organize the documents and maintain location information of the documents within the organization. Application software, such as a database layer (not shown) or other software may provide alternative or additional levels of abstraction. The device drivers are communicatively interposed between the operating system (108) and the hardware (106) and is configured to provide an interface to the hardware (106).

The storage servers (e.g., storage server A (100), storage server B (102)) are communicatively connected to computing system (104). For example, the connection may be via one or more networks, such as the Internet or an intranet. Computing system (104) may be a computing system as described below with reference to FIGS. 8A and 8B.

As shown in FIG. 1, the computing system (104) includes functionality to execute an accounting application (118) and a document manager (120) in accordance with one or more embodiments. The accounting application (118) is a software application configured to perform accounting functions. For example, the accounting application may record and process accounting transactions. The accounting application may maintain accounts payable, accounts receivable, general ledger, payroll, etc. In one or more embodiments, the accounting application includes functionality to maintain information about financial transactions (e.g., transactions involving the exchange of goods/services for money). The accounting application may be a tax preparation application. In particular, a tax preparation application may assist a user in preparing the user's tax return or the tax return of another entity (e.g., individual, organization, etc.). The accounting application may include functionality to provide invoicing functions (e.g., prepare/send/track invoices, and receive payment on invoices) for a business. For example, the accounting application (118) may be a personal accounting application (e.g., to manage a user's finances), a business accounting application (e.g., to manage the finances of a business), an enterprise accounting application (e.g., to manage the finances of multiple clients of an accounting firm).

The accounting application (118) includes one or more workflow managers (122) and a document management agent (124). A workflow manager (122) includes functionality to manage an accounting workflow. In general, a workflow is a set of processes by which a project may proceed from initiation to completion. Each process in the workflow may have one or more tasks, whereby a task is a discrete unit of work. For example, a project may be to create and file a tax return. An accounting workflow is a workflow for accounting projects. The accounting workflow is an instance of an accounting workflow type. The accounting workflow type is the type of the accounting workflow. By way of an example, the accounting workflow type may be the creation and filing of a tax return for an entity and one or more users. The accounting workflow (i.e., instance of the accounting workflow type) is the creation and filing of the particular tax return for a particular entity and by a particular set of one or more users.

By way of another example, the accounting project may be the preparation of quarterly reports. In the example, the accounting workflow is the preparation of the quarterly reports for a particular quarter, a particular entity and by a particular set of one or more users. Further, in the example, the accounting workflow type is the quarterly reports for an entity and by a user. Accounting workflows may be continuous or discrete. A discrete workflow has a defined completion point. A continuous workflow may have no defined completion point. By way of examples, the preparation and filing of a tax return and completion of quarterly reports are discrete, whereas an accounting workflow for the creation and tracking of a business' invoices is continuous. In other words, as long as a business is in operation, the business may continuously have invoices to be created and tracked. A single accounting workflow or multiple accounting workflows may be concurrently performed by the accounting application (118). The workflow manager (122) may include functionality to assist in a single accounting workflow or in multiple accounting workflows.

A document management agent (124) is a portion of the accounting application (118) that connects to the document manager (120) described below. For example, the document management agent (124) may be a software module or plugin for the accounting application (118). The document management agent (124) includes functionality to identify the accounting workflow currently being performed and present a virtual storage interface (described below) matching the accounting workflow. For example, the document management agent (124) may be configured to manipulate the file system interface provided by the accounting application (118). As another example, the document management agent (124) may be configured to provide a file system interface for the accounting application.

The document management agent (124) is communicatively connected to a document manager (120). The document manager (120) is software that includes functionality to manage the presentation of the documents in the storage repository (105). The document manager (120) may have a document management storage structure (126), an index (128), a virtual storage interface (130), and document organizational structure(s) (132).

The document management storage structure (126) is the storage structure of the storage repository (105) as presented and used by the document manager (120). In other words, to the document manager (120), the document management storage structure (126) remains constant unless documents are moved, created, deleted, or folders/locations are moved, created or deleted. The document management storage structure may be a hierarchical storage structure (e.g., a file system having folders, subfolders, and files), a database of files, a flat storage structure (e.g., a set of files, whereby each file is on a single level), or other organization.

In one or more embodiments, documents in the document management storage structure are maintained in files. FIG.

Figure 2:
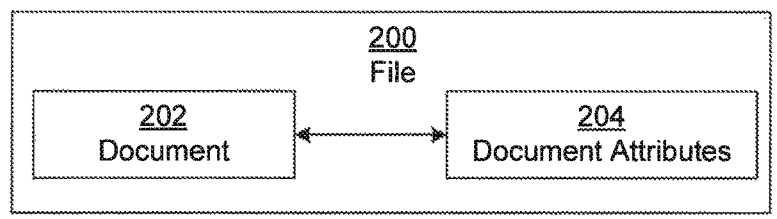

2 shows a schematic diagram of a file (200) in accordance with one or more embodiments of the invention. Turning briefly to FIG. 2, a file (200) is a computer data file. The file (200) include the document (202) and document attributes (204). A document (202) is a discrete collection of content for presentation to a user. The document (202) may include text, images, audio content, multimedia content, or any combination thereof. For example, the document may be a form, a presentation, a scanned image of a receipt, a spreadsheet document, or other documents. A form may be an accounting form, such as a tax return form. The form may have a type that defines the content within the form. In other words, the type defines the location of each of the fields within the form, such that the content from the form may be extracted from the form. In one or more embodiments, an identifier of the type may be on the form.

The document attributes (204) are attributes of the document (202). In particular, the document attributes (204) may include the administrative information about the document (202) and information about the contents of the document (204). For example, administrative information about the document (202) may be a user identifier of the user who created the document, creation date of the document, one or more modification dates, accounting workflow in which document is created, name of document, document file type, access permissions (e.g., which users may read/write/modify the document and permission level) and other information. Information about the contents of the document may be accounting information. Accounting information includes form type, the client identifier of the client (e.g., customer) of a user using an accounting application, accounting workflow in which document is used, and other such accounting information. Document attributes are in the form of the attribute value and the attribute type. The attribute value is the value for the particular document, and the attribute type is the information that the value represents (e.g., "filename," "client identifier," "user name," "modification date," etc.). The document attributes (204) may be stored in the file as metadata of the file. The document attributes may be stored as attribute value, attribute type pairs.

Returning to the document manager (120) in FIG. 1, the index (128) is structure that links document names to document locations to the document attributes. The index may use one or more of the document attributes as a key to identify particular documents. Although a single index is shown, multiple indexes may exist. The index (128) is searchable and may return documents matching the search.

A virtual storage interface (130) is a presentation of the documents in the storage repository (105). The virtual storage interface (130) is different organization of documents from the document management storage structure (126) and is the output of the document manager (120). The virtual storage interface (130) changes without an underlying change of the document management storage structure (126). Specifically, the organization of the documents as presented in the virtual storage interface (130) changes even when the underlying organization of the documents and set of documents remains the same. In one or more embodiments, the virtual storage interface changes based on accounting workflow. In one or more embodiments, the virtual storage interface changes based on user identifier of the user using the accounting application and/or client identifier of the client of the user on whose behalf the accounting application is being used.

The virtual storage interface (130) may be a virtual file system interface. In a file system interface, documents are presented as a hierarchy of files. The files are in the leaf nodes of the hierarchy. The root nodes and intermediate nodes are folders and subfolders. A subfolder is a folder within another folder. Thus, the root node is the top most folder of the hierarchy. In one or more embodiments, a same subfolder may be in multiple different folders of the hierarchy, whereby the multiple different folders are not in a parent child relationship with each other. In other words, the multiple different folders may not be in an ancestral lineage with each other.

Folders and subfolders in the virtual storage interface (130) are virtual in that not only are the documents and folders virtualized by the operating system, but also by the document manager (120) to create the virtual storage interface (130). The folders and subfolders may change between users and accesses to the virtual storage interface (130) regardless of the document management structure (126). Users may open a virtual folder to view the contents of the virtual folder. The contents of a virtual folder are the virtual subfolder and documents directly listed in the virtual folder. In one or more embodiments, the virtual file system interface appears identical to a WINDOWS® operating system file system interface, a MAC® operating system file system interface, or another operating system file system interface of the operating system on which accounting application executes. WINDOWS® is a registered trademark of Microsoft Corporation located in Redmond, Wash. MAC® is a registered trademark of Apple Corporation located in Cupertino, Calif.

A document organizational structure (132) is a template defining how to create a virtual storage interface (130). In one or more embodiments, a distinct and individual document organizational structure (132) exists for each accounting workflow type. The document organizational structure for one accounting workflow type may be different than the document organizational structure for another accounting workflow type. Further, the relationships between document organizational structures to accounting workflows may vary between users, roles of users, and accounting firms. If the virtual storage interface is a virtual file system interface, the document organizational structure defines the arrangement of the folders and subfolders of the virtual file system interface. Specifically, rather than identifying specific folders/subfolders/documents and the organization thereof, the virtual file system interface defines the properties of the folders/subfolders/and documents. The properties may be the attribute types of the document attributes. The properties may define sizes or ranges of attribute values of the documents. Further, the document organizational structure may define a hierarchical arrangement of the properties.

Although FIG. 1 shows the computing system as communicating directly with the storage servers, the computing system may communicate with one or more intermediate servers. The intermediate servers may maintain indexing information mapping storage servers to documents stored on the respective storage servers.

Although FIG. 1 shows an embodiment that uses distributed storage, one or more embodiments may be applied to a system in which the documents are stored on the same computing device as the accounting application. In some embodiments, all of the documents are stored on the same device as the accounting application. In other embodiments, only a portion of the documents are stored on the same device as the accounting application.

Figure 3:
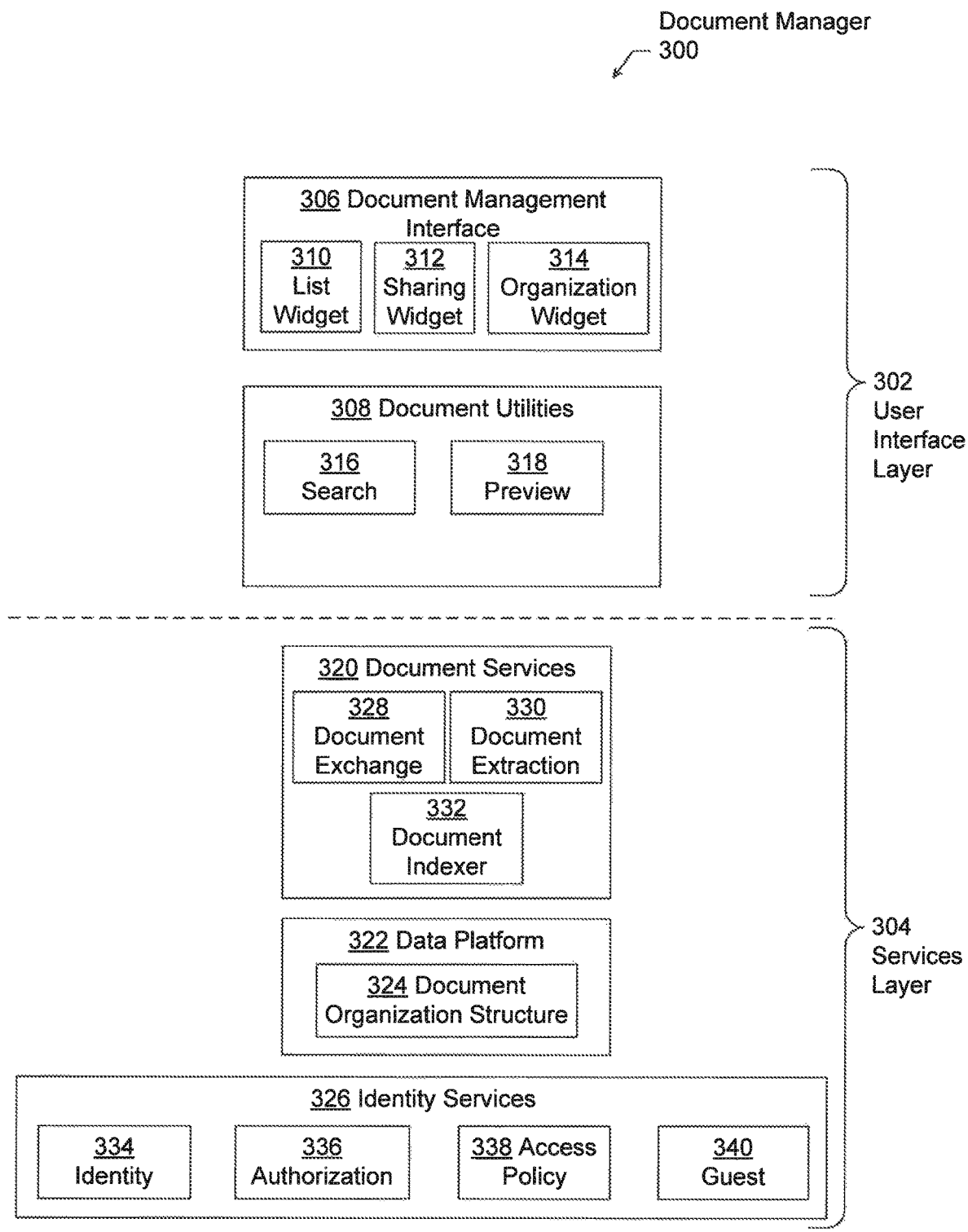

FIG. 3 shows another view of the document manager of FIG. 1 in accordance with one or more embodiments of the invention. Specifically, FIG. 3 shows additional components of the document manager (300) in one or more embodiments.

As shown in FIG. 3, the document manager (300) has a user interface layer (302) and a services layer (304). The user interface layer (302) is the layer that is exposed to the user and accessible via the user interface (e.g., the user interface of the accounting application). In one or more embodiments, the user interface layer (302) may be provided by the document management agent in FIG. 1. The user interface layer includes a document management interface (306) and document utilities (308). The document management interface (306) includes a list widget (310), sharing widget (312), and organization widget (314). The list widget (310) is configured to list the documents as the virtual storage interface. For example, the virtual storage interface may present a flat list for a particular accounting workflow. The sharing widget (312) is configured to share and show shared documents. For example, the sharing widget (312) may show the documents that are shared by the accounting firm or by the firm client. The organization widget (314) includes the ability to organize based on attributes and document organizational structure that the firm is used to working. The organization widget may be used to manage the virtual storage interface when the listing widget is not used.

The document utilities (308) include search (316) and preview (318). Search (316) is a capability for a user to perform a keyword search on the document. The search (316) searches the attributes of documents in the document organizational structure and shows documents matching the search. The preview (318) is a capability to view a document without opening the document.

The services layer (304) include document services (320) for services on the documents, the data platform (322) having the document organizational structure (324), and the identity services (326). The document organizational structure (324) may be the same or similar to the document organizational structure in FIG. 1. The document services (320) include document exchange (328) to manage the sharing of documents, document extraction (330) to extract the contents of the document and obtain attribute values from the contents, and document indexer (332) to create the index(es) and perform searches based on attributes. The identity services (326) include identity (334) to manage user identities, authorization (336) to authorize users to access documents, access policy (338) to manage access policies for documents, and guest services (340) to provide guest users (i.e., users without identity) to have limited access to documents.

While FIGS. 1-3 show a configuration of components, other configurations may be used without departing from the scope of the invention. For example, various components may be combined to create a single component. As another example, the functionality performed by a single component may be performed by two or more components.

Figure 4:
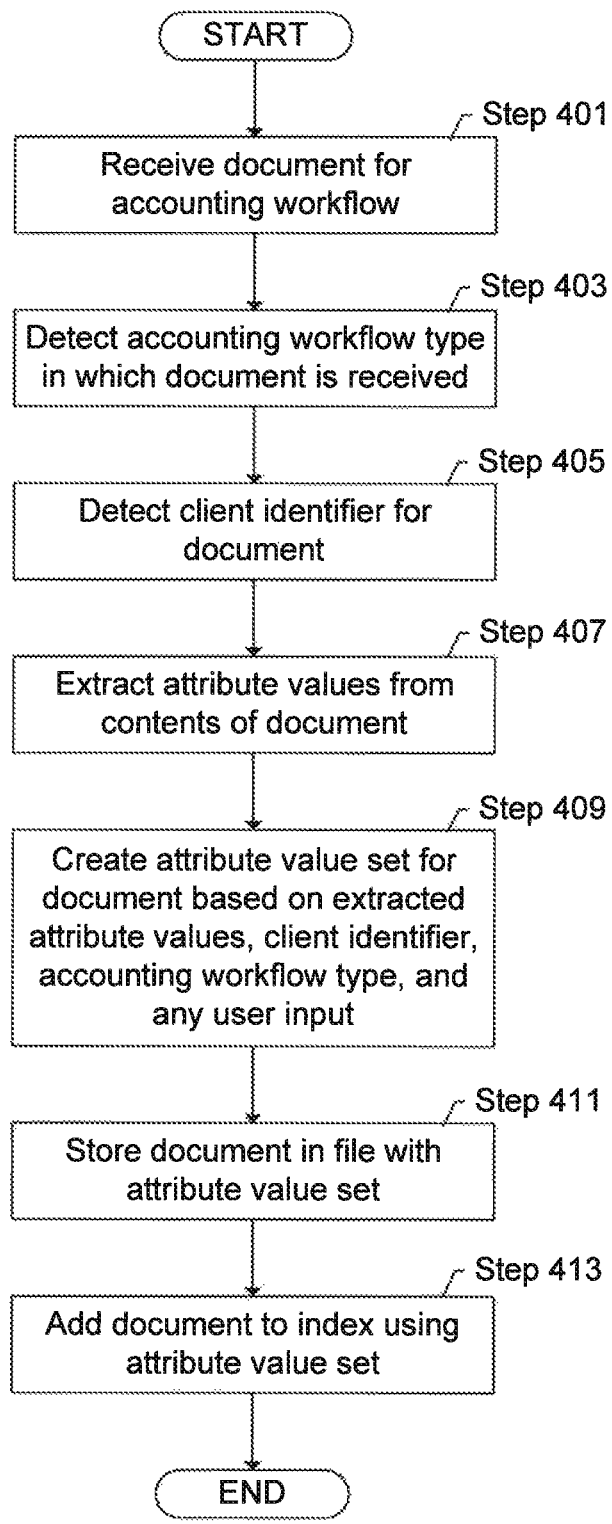
FIGS. 4, 5, and 6 show flowcharts in accordance with one or more embodiments of the invention.
Figure 5:
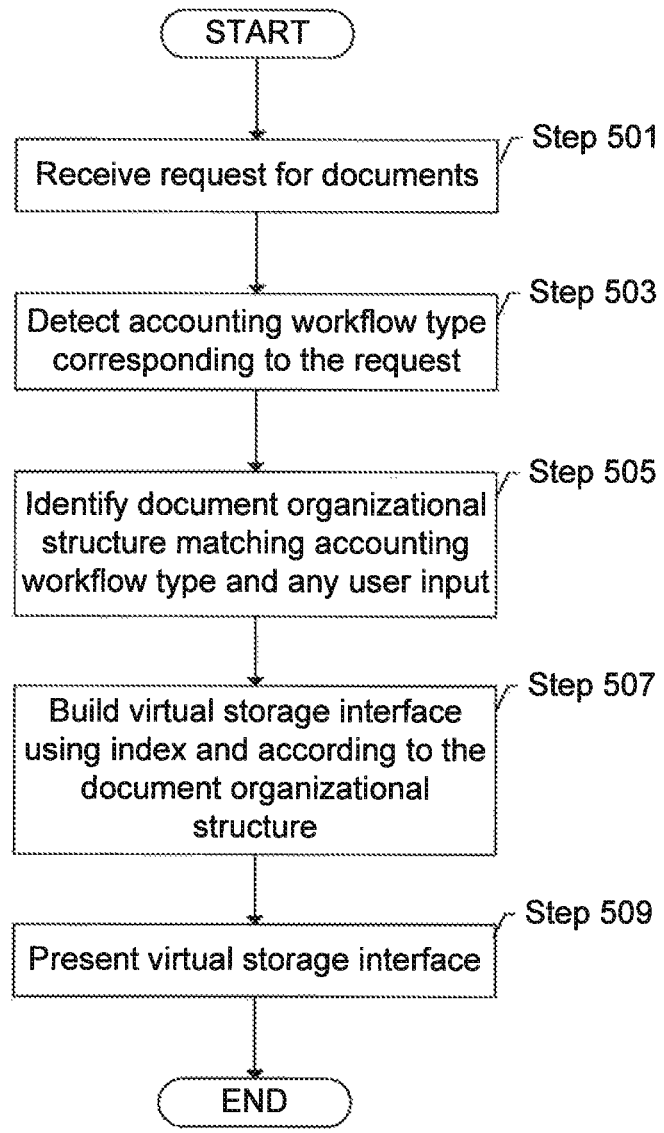
Figure 6:
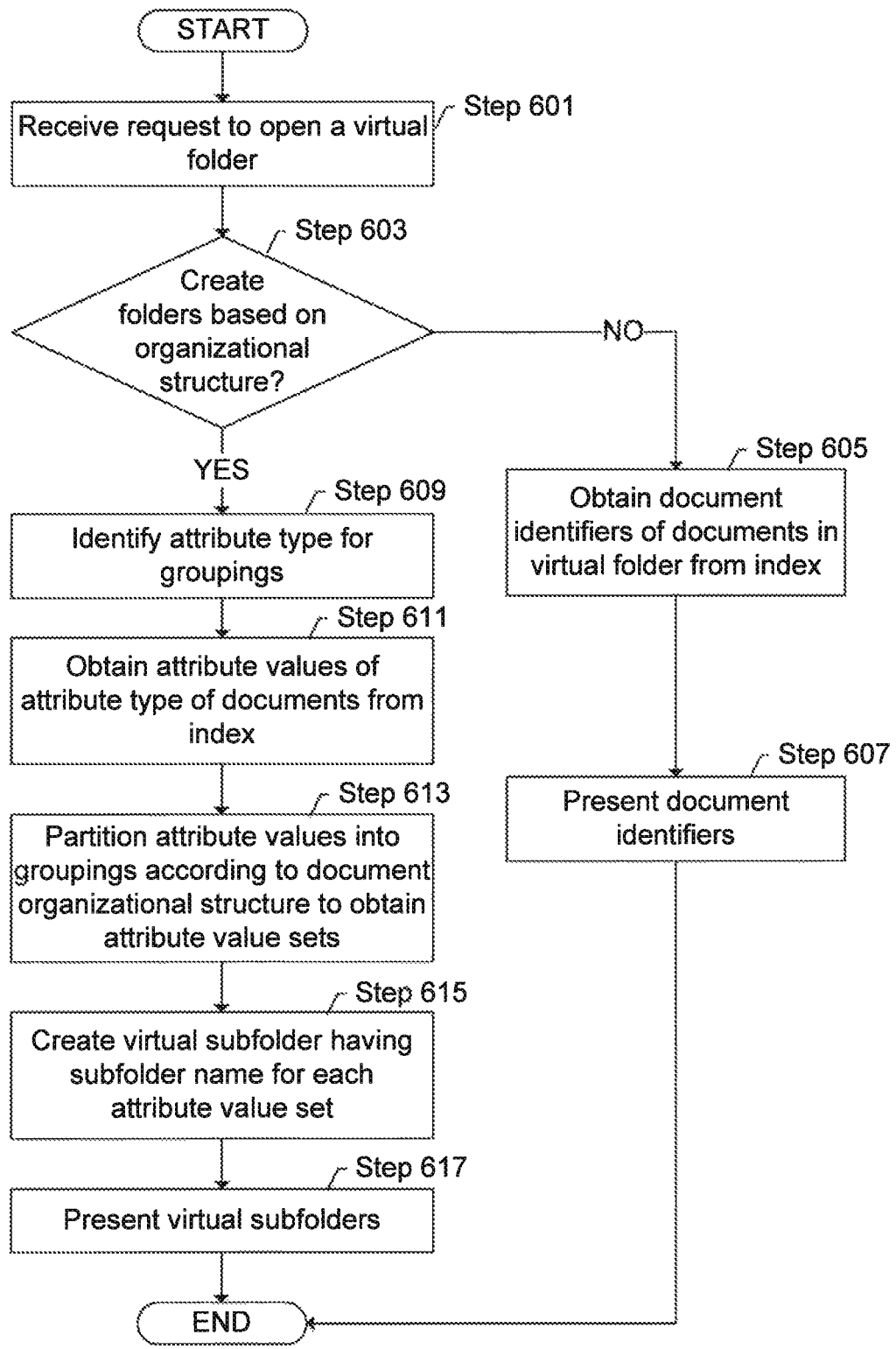

FIGS. 4-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 shows a flowchart for adding a document to the document organizational structure in accordance with one or more embodiments of the invention. In Step 401, a document for an accounting workflow is received. For example, a user may request to start a new document of a defined document type (e.g., tax return, cash flow statement, income statement, etc.) in an accounting workflow and request to save the document. As another example, the document may be uploaded into an accounting workflow. For example, the user may select to upload a locally stored document into an accounting workflow. By way of another example, a user or client may respond to a request for one or more documents with the document. The accounting application may receive the response as part of the sharing system.

In Step 403, the accounting workflow type in which the document is received is detected. In one or more embodiments, the sharing services, document management agent or other entity detects to which accounting workflow or set of accounting workflows the document is used. Each accounting workflow has a corresponding accounting workflow type that is managed by the corresponding workflow manager. In other words, the context of the accounting application in which the document is received may be used. The accounting workflow type may be detected.

In Step 405, the client identifier for the document is detected. The client identifier may be detected from the contents of the document, the accounting workflow, or another location. For example, the client identifier may be extracted from metadata for the accounting workflow or from a field in the document.

In Step 407, attribute values are extracted from the contents of the document in accordance with one or more embodiments of the invention. If the document is a form, then the attribute values may be extracted by identifying the type of form and extracting values from various fields of the form according to a template. If the document is a text document, the document may be parsed, and words and phrases identified. Words and phrases that match a set of rules may be extracted as attribute values of the document. Further, attribute values may be identified from metadata of the document when the document is received.

In Step 409, an attribute value set is created for the document based on the extracted attribute values, client identifier, accounting workflow type and any user input. For example, a user may provide additional information about the document contents. For each attribute type used by the document manager, the attribute value is identified if the attribute value exists and added to the attribute value set.

In Step 411, the document is stored in the file with the attribute value set. The file having the document and the document attributes is sent to the native storage structure of the storage repository. The sending of the document may be by the document manager selecting a storage location in the document management storage structure. The native techniques of the storage repository store the documents. Thus, if the storage repository is on the same computing system as the document manager, the operating system may store the document using techniques known in the art. If the storage repository is a database, the database manager may store the document and expose the storage location via the document management storage structure.

In Step 413, the document is added to the index using the attribute value set in accordance with one or more embodiments of the invention. In other words, the document manager relates the attribute values, document location, and document in the index.

Using the index, the virtual storage interface may be created and presented to a user. FIG. 5 shows a flowchart for creating and presenting a virtual storage interface in accordance with one or more embodiments of the invention. In Step 501, a request for documents is received. For example, using the accounting application and while working in an accounting workflow, the user may request to open a file, store a new file, or otherwise access a file system. The user may perform the request within the accounting application. The request may be sent to the document management agent in the accounting application. The document management agent may send the request to the document manager.

In Step 503, the accounting workflow type corresponding to the request is detected. The document management agent identifies the context in which the request is received. For example, if the user has a set of accounting workflows being concurrently performed, the document management agent identifies the current accounting workflow within the set that is open. The document management agent identifies the accounting workflow type from the accounting workflow, such as from the metadata of the accounting workflow. The document management agent may identify additional information, such as the user identifier, client identifier, accounting firm, and other information about the context of the request.

In Step 505, the document organizational structure matching the accounting workflow type is identified. If multiple document organizational structures exist that match the accounting workflow type, then the additional information about the accounting workflow may be used to identify the document organizational structure. In one or more embodiments, the document organizational structure may be identified based on properties of the document organizational structure, rules that relate the document organizational structure to the accounting workflow type or other information.

In Step 507, the virtual storage interface is build using the index and according to the document organizational structure. As described above, the document organizational structure is a template for building the virtual storage interface. In other words, the document organizational structure provides a framework for organizing documents without identifying specific folders or documents in the organization. Thus, at runtime of the accounting application, when a user requests documents, the virtual storage interface with the actual organization and the document is created. Notably, if the user continues to request documents during the same execution of the accounting application and the user uses the same accounting workflow, the previously created virtual storage interface may be used.

In one or more embodiments, creating the virtual storage interface includes iterating through the instructions or rules of the document organizational code, and for each rule or instruction, performing a lookup in the index to identify documents or information about a group of documents matching the rule or instruction, and creating the interface using the information and according to the rule or instruction. In other words, the interface is built at runtime using the general rules or instructions that do not specifically identify the exact document organization in the interface.

In Step 509, the virtual storage interface is presented. Presenting the virtual storage interface may include displaying the virtual storage interface on a display device. For example, the virtual storage interface may be displayed in the graphical user interface. If the accounting application is a remotely executed application, such as a web application, presenting the virtual storage interface may be performed by sending the virtual storage interface to a computer system of the user, such as in order to display in a web browser application.

In one or more embodiments, the building and presenting the virtual storage interface may be performed concurrently. For example, as a user explores sections of the virtual storage interface or requests additional sections, the additional sections may be built.

For example, FIG. 6 shows a flowchart for building a virtual storage interface when the virtual storage interface is a virtual file system. In the example of FIG. 6, the building is performed concurrently with presenting sections of the virtual file system.

In Step 601, a request to open a virtual folder is received. For example, if no section of the virtual storage interface is being presented, then the request may be the first request to open the virtual storage interface. Receiving the request may be performed as described above with reference to Step 501 of FIG. 5. In such a scenario, the determination may be made to open the default initial virtual folder as defined, for example, in the document organizational structure. If a section of the virtual storage interface is being presented, then the request may be to expand an existing displayed virtual folder. In other words, the request is to display the contents of the folder similar to a file system interface presented by an operating system.

In Step 603, a determination is made whether to create folders based on the document organizational instructions. Determining whether to create folders is based on whether the document organizational structure indicates that the virtual folder to be opened should include virtual subfolders or documents.

If the determination is made not to create folders, then, in Step 605 document identifiers of documents in the virtual folder are obtained from the index. Specifically, each virtual folder has a corresponding set of properties. The set of properties include document attribute values and/or ranges of document attribute values for documents in the virtual folder. When the virtual folder is created, the virtual folder is associated, in metadata, with the set of properties. Thus, when a request is received, the index may be searched to obtain document identifiers of documents having attribute values matching the set of properties. In other words, the attribute value of each identified document should be identical to the attribute value in the property or be within the range of attribute values in the property for each property of the virtual folder. Using the index, the document identifiers of document satisfying the criteria of the virtual folder is identified. Notably, the document organizational structure is not preconfigured with the matching documents, but rather only specifies that virtual folder should directly include documents. The building of the virtual file system interface at runtime creates the actual virtual organization.

In Step 607, the document identifiers are presented. Presenting the document identifiers may be performed as discussed above with reference to Step 509 of FIG. 5.

Returning to Step 603, if a determination is made to create folders, an attribute type for groupings is identified in Step 609. The attribute type for the grouping is defined in the document organizational structure for the virtual folder.

More than one attribute type may be defined. Thus, identifying the attribute type may include identifying the current level of the virtual folder to be opened in the document organizational structure, identifying the attribute type(s) of the next level in the document organizational structure.

The attribute values of the attribute type of the documents is obtained from the index in Step 611. The virtual folder referenced in Step 601 corresponds to a set of properties as described above. In Step 611, the index is searched to identify the attribute values of attribute types identified in Step 611 for the documents matching the properties of the virtual folder.

By way of an example, consider the scenario in which a user has clients A, B, and C. Client A has tax returns for 1984-2017. Client B has tax returns for 1993-1998, 2003-2007, and 2010-2017. Client C has tax returns for 2010-2015 and 2017. In other words, the documents are the tax returns, where each tax return is for a specific client and a specific year. The virtual folder requested to be opened is for client C. In the example, the property of the virtual folder is client C. Further, the document organizational structure indicates that the next level in the virtual file system interface is to group based on tax year. Thus, the attribute type is tax year. The index is searched to obtain attribute values of the attribute type for any document matching the properties of the virtual folder requested to be opened. Because the properties of the virtual folder are just client C, the attribute values of the tax return attribute type are 2010-2015 and 2017. Thus, 2010, 2011, 2012, 2013, 2014, 2015, and 2017 is returned from the search performed for Step 611 in the example. The attribute values for non-matching documents are not returned. In other words, in the example, the tax years (e.g., 1984-2009) of tax returns for other clients are excluded.

Continuing with FIG. 6, in Step 613, the attribute values are partitioned into grouping according to the document organizational structure to obtain attribute values sets. Each set may have a single attribute value for an attribute type or a range of attribute values for an attribute value type. Ranges may be defined in the document organizational structure as a size of a range (e.g., 5 tax years per attribute value set), a number of virtual subfolders (e.g., create at most 6 virtual subfolders), or using another technique. Because the attribute values are unknown when the document organizational structure is defined, the document organizational structure does not specify attribute values for the virtual subfolders, but rather provides a general definition of the attribute type and how to partition attribute values of the attribute type.

In Step 615, for each attribute value set, a virtual subfolder having a sub folder name is created. In other words, a graphical user interface widget is created for the virtual subfolder. Further, the graphical user interface widget is created with a name of the virtual subfolder. In one or more embodiments, the name is the attribute values in the attribute value set, or a form thereof. For example, the name may be "Tax Year 2015-2017." The process of creating graphical user interface widgets is performed for each attribute value set.

In Step 617, the virtual subfolders are presented. Presenting the virtual subfolders may be performed in a same or similar manner as described above with reference to Step 509 of FIG. 5.

The user may select a virtual subfolder to open a virtual subfolder and start the process of FIG. 6 again for the selected virtual subfolder. Similarly, the user may explore the virtual file system interface in a same or similar manner to exploring a file system interface of an operating system. When the user selects virtual folders, which has not yet been presented, the process of FIG. 6 may be performed.

Although FIG. 6 shows that the virtual folder includes virtual subfolders or document identifiers, the virtual folder may include both virtual subfolders for some documents and document identifiers for other documents. For example, the document organizational code may specify that when only a single document is in a virtual subfolder, then the single document identifier of the single document is presented rather than creating a separate virtual subfolder. In such a scenario, both sets of steps (i.e., Steps 609-617 and Steps 605-607) in FIG. 6 may be performed.

FIGS. 7A, 7B, 7C, and 7D show examples in accordance with one or more embodiments of the invention. The following examples are for explanatory purposes only and not intended to limit the scope of the invention.

In the example, consider the scenario in which employees of an accounting firm are generating quarterly reports for clients. In the example, a separate accounting workflow exists for each client to generate the client's quarterly reports. The corresponding accounting workflow type is quarterly report generation. The document manager has a relationship between quarterly report generation and the following document organizational structure:

a. A virtual folder for the accounting firm attribute has virtual subfolders for the tax year attribute. Each attribute value of tax year has a separate virtual subfolder.

b. The virtual subfolders for tax year attribute each have a virtual subfolder for the client identifier attribute. Each attribute value of client identifier has a separate virtual subfolder.

c. The virtual subfolders for the client identifier attribute each have a private virtual subfolder and a shared virtual subfolder.

d. The private virtual subfolder has documents with attribute private set and the shared virtual subfolder has documents with attribute shared set.

As shown in the example, the document organizational structure specifies the organization of documents in the virtual file system interface without specifically identifying a virtual subfolder or document.

Figure 7A:
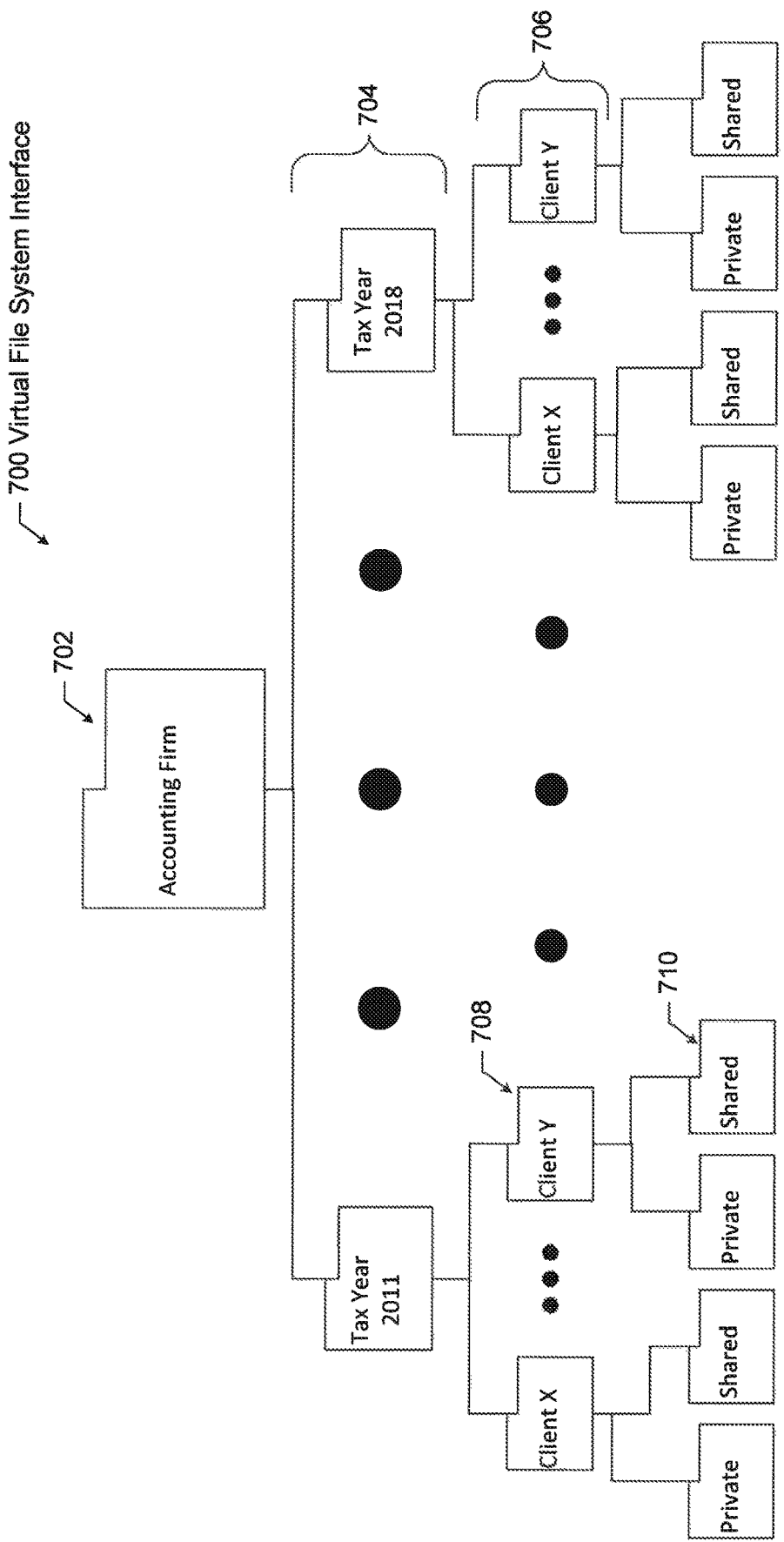
FIGS. 7A, 7B, 7C, and 7D show an example in accordance with one or more embodiments of the invention.

Continuing with the example, when an employee is generating quarterly reports for the client, the employee requests to open the file system interface of the accounting application. In response, the accounting application determines that the accounting workflow is to generate quarterly reports and identifies the above document organizational structure. The accounting application generates the virtual file system interface (700) shown in FIG. 7A. As shown in FIG. 7A, accounting firm virtual folder (702) includes a virtual subfolder for each tax year in which the accounting firm has documents. In other words, a separate virtual subfolder (704) exists for tax years 2011 to 2018.

Additionally, the document manager determines that each tax year has documents for client identifier X to client identifier Y. Accordingly, for each tax year virtual subfolder (704), a separate virtual subfolder (706) exists for client identifier X to client identifier Y. Each client virtual subfolder has a separate virtual subfolder for private documents and shared documents.

In the example, the properties of virtual subfolder (708) is accounting firm, tax year 2011, and client Y. Documents having attribute values of accounting firm (i.e., belonging to the accounting firm), tax year: 2011, and client id: client Y are deemed to match virtual subfolder (708). The properties of virtual subfolder (710) include the properties of virtual subfolder (708) with the additional property of shared. Thus, Documents having attribute values of accounting firm, tax year: 2011, and client id: client Y, and sharing status: shared are deemed to match virtual subfolder (710).

Because of the organization, the employee may generate quarterly reports using an organization of documents that is natural and more optimal for the generation of quarterly reports.

Continuing with the example, next consider the scenario that the employee realizes that the employee also needs to do a tax return for a client. Thus, the employee starts a tax return accounting workflow. The tax return accounting workflow type is associated with the following document organizational structure:

a. A virtual folder for the accounting firm attribute has subfolders for the client identifier attribute. Each attribute value of client identifier has a separate virtual subfolder.

b. Each virtual sub folder for client identifier has a virtual subfolder for accounting, payroll, and tax attribute values.

c. The accounting virtual subfolder has a virtual subfolder for private attribute value and a virtual subfolder for shared attribute value.

d. The payroll virtual subfolder has a virtual subfolder for private attribute value and a virtual subfolder for shared attribute value.

e. The virtual subfolder for tax has a separate virtual subfolder for each tax year attribute value.

f. The subfolders for tax year attribute each have a private virtual subfolder and a shared virtual subfolder.

g. The private subfolder has documents with attribute private set and the shared subfolder has documents with attribute shared set.

Figure 7B:
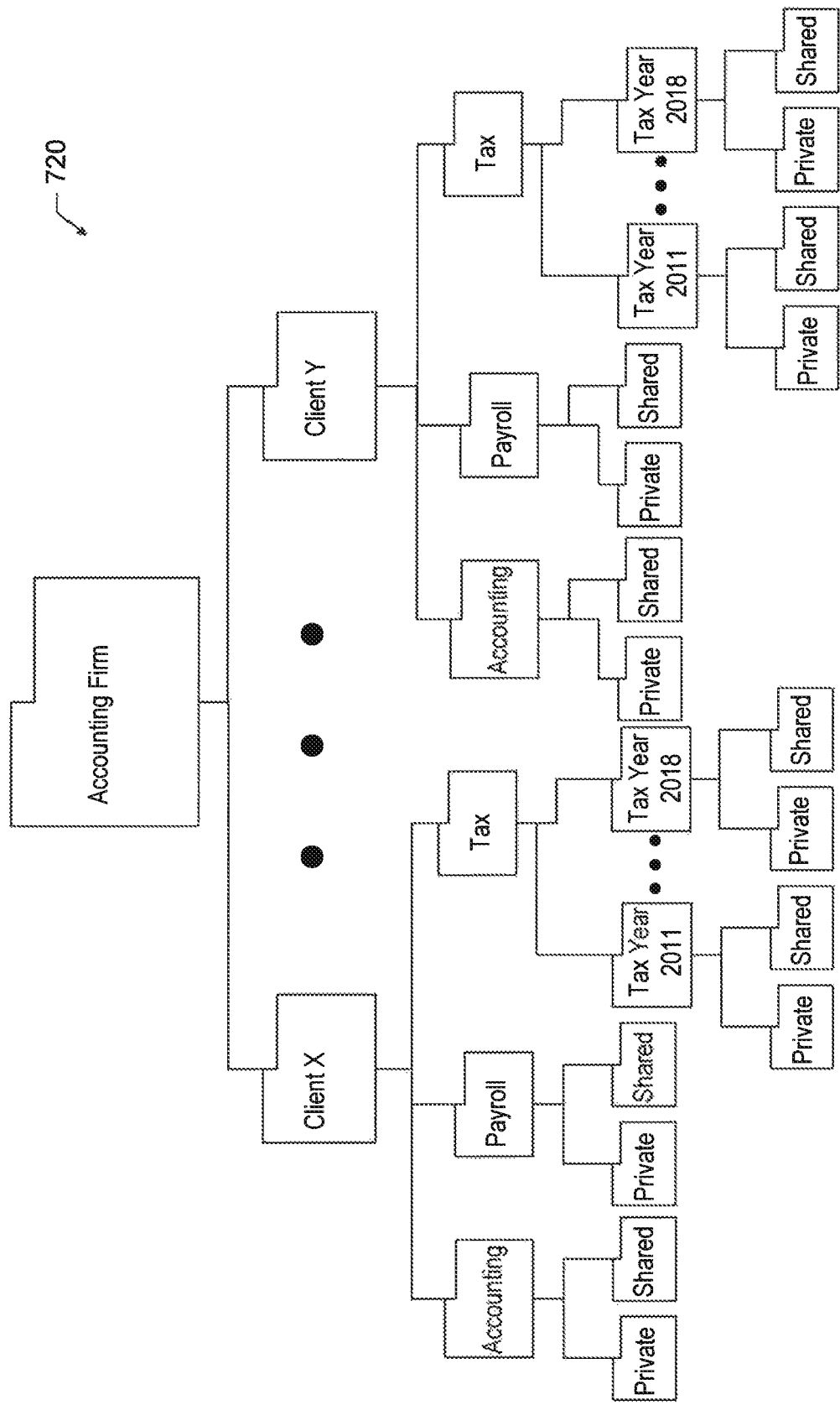

As shown in the example, the document organizational structure for the tax return accounting workflow type specifies a different organization of documents than the quarterly report accounting workflow type. When the employee requests to access the file system interface while performing the tax return accounting workflow, the virtual file system interface (720) shown in FIG. 7B is generated. As shown in FIG. 7B, the same set of documents are organized differently than in FIG. 7A. Further, the organization matches the tax return accounting workflow currently being performed. Because the organization is virtual, the modification does not change stored relationships between documents.

Figure 7C:
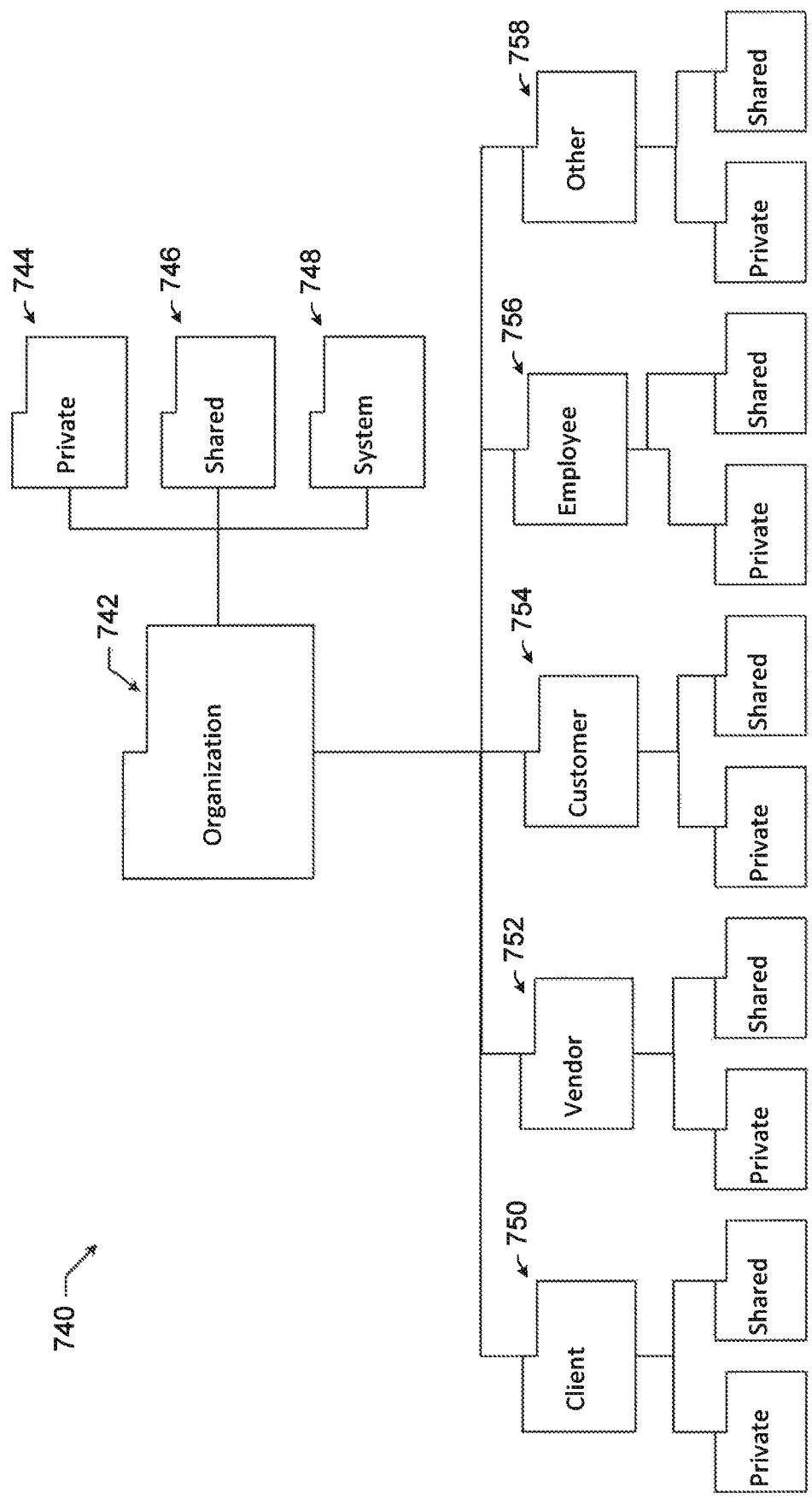

FIG. 7C shows another example of the virtual storage structure (740) of documents for the firm. In the example, the organization virtual folder (742) has virtual subfolders for private (744), shared (746), and system (748). The documents are organized into each of the virtual subfolders according to whether the document has an attribute value of private, shared, and/or system set. The same documents are also organized into virtual subfolders of client (750), vendor (752), customer (754), employee (756) and other (758). A private and shared virtual subfolder exists for each virtual subfolder. In one or more embodiments, when an employee traverses through the virtual file system interface (740) shown in FIG. 7C, even though the document may be in more than one virtual subfolder, the document in one of the virtual subfolders does not appear to be a shortcut to the other virtual subfolder.

Figure 7D:
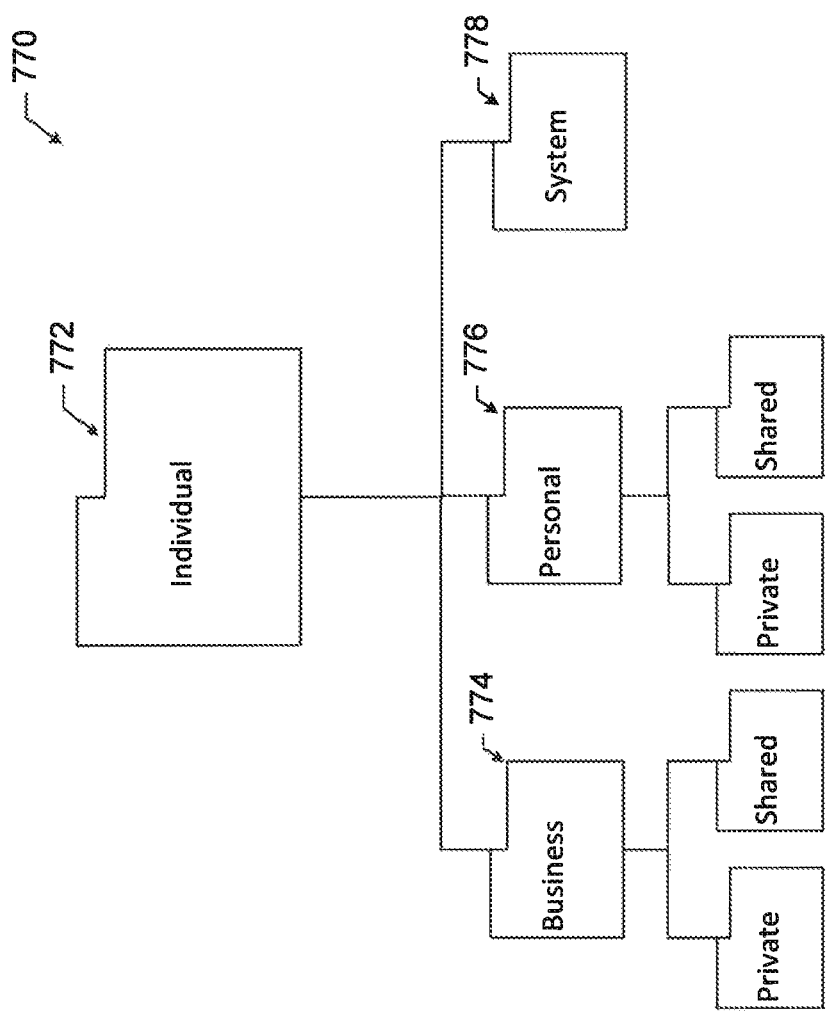

FIG. 7D shows another example virtual file system interface for the set of documents of FIGS. 7A, 7B, and 7C. In the example of FIG. 7D, consider the scenario in which a client of the firm of FIG. 7A is accessing the client's documents on the same storage repository. The virtual file system interface only shows the client's documents. The client has a virtual folder (772) labeled individual to reflect that the client is using the individual version of the accounting application. The client has virtual subfolders of business (774), personal (776), and system (778). The virtual subfolders of business and personal each have virtual subfolders of private and shared. As shown in the example, when the employee of the firm discussed above in the example wants the client to review the client's documents using the client's accounting application, the virtual file system interface is created for the client. The underlying documents and organization of the documents to the document manager remains unchanged.

Although the above discussion organizes documents based on an accounting workflow, documents may be organized based on employees. In other words, rather than or in addition to the accounting workflow type being related to document organizational structures, the employee identifier may be related to the document organizational structure. Thus, the employee identifier may be used to identify an organization of document. Other triggers in addition to or as an alternative to employee identifier and accounting workflow type may be related to document organizational structures and used to create the virtual organization in some embodiments.

Figure 8A:
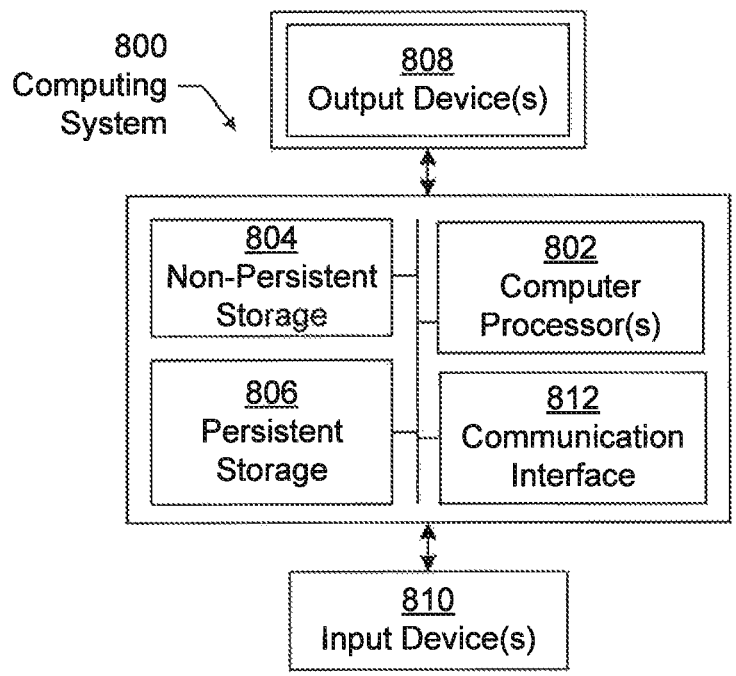
FIGS. 8A and 8B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments the invention.

Figure 8B:
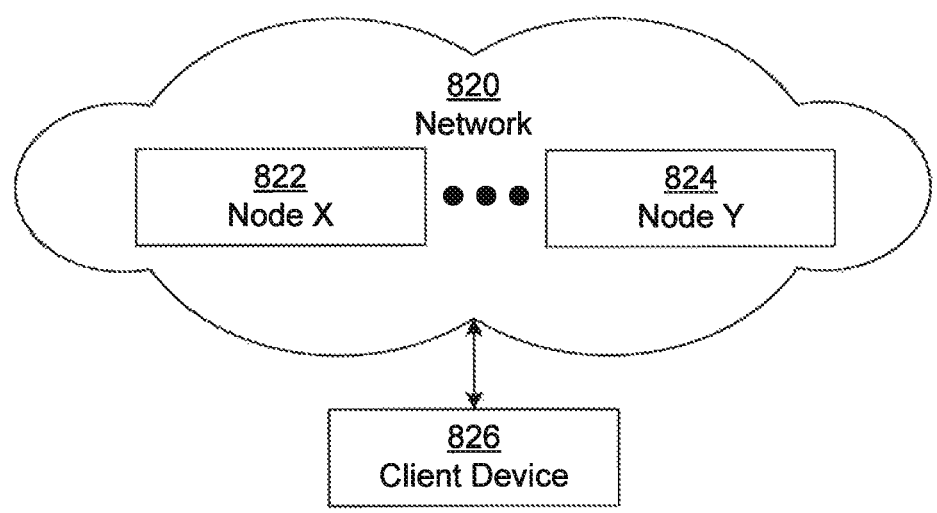

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for a storage interface comprising:
receiving a first request for a plurality of documents, the first request received as part of a first accounting workflow comprising a sequence of tasks;
detecting a first accounting workflow type from the first accounting workflow, the first accounting workflow type corresponding to the first request, and the first accounting workflow is an instance of the first accounting workflow type;
identifying a first document organizational structure matching the first accounting workflow type;
building a first virtual storage interface using an index on the plurality of documents and according to the first document organizational structure; and
presenting the first virtual storage interface.

2. The method of claim 1, further comprising:
receiving a request to open a virtual folder in the first virtual storage interface;
identifying an attribute for a plurality of virtual subfolders in the virtual folder;
obtaining a plurality of attribute values of the attribute of a subset of the plurality of documents in the virtual folder from the index;
partitioning the plurality of attribute values into a plurality of attribute value sets;
creating a virtual subfolder for each attribute value set of the plurality of attribute value sets to obtain the plurality of virtual subfolders; and
presenting the plurality of virtual subfolders.

3. The method of claim 2, further comprising:
determining the subset of the plurality of documents in the virtual folder based on the index and the first document organizational structure.

4. The method of claim 1, further comprising:
receiving a request to open a virtual folder in the first virtual storage interface;
determining, from the first document organizational structure, that the virtual folder is a leaf node of the first document organizational structure;
determining a subset of the plurality of documents in the virtual folder based on the index and the first document organizational structure; and
presenting a document identifier for each of the plurality of documents in the subset.

5. The method of claim 1, further comprising:
receiving a document for a second accounting workflow;
detecting a second accounting workflow type of the second accounting workflow, the second accounting workflow type is one of tax return preparation and quarterly report preparation;
creating an attribute value set based on the second accounting workflow type; and
storing the attribute value set with a document identifier of the document in the index.

6. The method of claim 5, further comprising:
detecting a client identifier for the document,
wherein the attribute value set is further created based on the client identifier.

7. The method of claim 5, further comprising:
extracting an attribute value from a plurality of contents of the document,
wherein the attribute value set is further created based on the attribute value.

8. The method of claim 1, further comprising:
receiving a second request for the plurality of documents;
detecting a second accounting workflow type corresponding to the second request;
identifying a second document organizational structure matching the second accounting workflow type;
building a second virtual storage interface using the index on the plurality of documents and according to the second document organizational structure; and
presenting the second virtual storage interface.

9. The method of claim 8, wherein the first virtual storage interface comprises a different folder hierarchy than the second virtual storage interface.

10. The method of claim 1, wherein the first document organizational structure is further identified based on a role of a user.

11. A system comprising:
a storage repository for storing a plurality of documents; and
at least one computer processor for executing a document manager, the document manager communicatively connected to the storage repository and configured to:
receive a request for the plurality of documents in the storage repository, the request received as part of an accounting workflow comprising a sequence of tasks;
detect an accounting workflow type from the accounting workflow, the accounting workflow type corresponding to the request, and the accounting workflow is an instance of the accounting workflow type;
identify a document organizational structure matching the accounting workflow type;
build a virtual storage interface using an index on the plurality of documents and according to the document organizational structure; and
present the virtual storage interface.

12. The system of claim 11, wherein the storage repository comprises a plurality of storage servers, each of the plurality of storage servers comprising a portion of the plurality of documents, wherein the virtual storage interface is a unified view of the plurality of documents on the plurality of storage servers, and wherein the accounting workflow type is one of tax return preparation and quarterly report preparation.

13. The system of claim 11, wherein the at least one computer processor is further configured to execute:
an accounting application for performing an accounting workflow of the accounting workflow type.

14. The system of claim 13, wherein the accounting application comprises a document management agent, wherein the document management agent is configured to interface with the document manager.

15. The system of claim 11, wherein the document manager comprises a document management storage structure, and wherein the document management storage structure relates each of the plurality of documents with an attribute value set.

16. A non-transitory computer readable medium comprising computer readable program code for a storage interface comprising:
    receiving a first request for a plurality of documents, the first request received as part of a first accounting workflow comprising a sequence of tasks;
    detecting a first accounting workflow type from the first accounting workflow, the first accounting workflow type corresponding to the first request, and the first accounting workflow is an instance of the first accounting workflow type;
    identifying a first document organizational structure matching the first accounting workflow type;
    building a first virtual storage interface using an index on the plurality of documents and according to the first document organizational structure; and
    presenting the first virtual storage interface.

17. The non-transitory computer readable medium of claim 16, further comprising computer readable program code for:
    receiving a request to open a virtual folder in the first virtual storage interface;
    identifying an attribute for a plurality of virtual subfolders in the virtual folder;
    obtaining a plurality of attribute values of the attribute of a subset of the plurality of documents in the virtual folder from the index;
    partitioning the plurality of attribute values into a plurality of attribute value sets;
    creating a virtual subfolder for each attribute value set of the plurality of attribute value sets to obtain the plurality of virtual subfolders; and
    presenting the plurality of virtual subfolders.

18. The non-transitory computer readable medium of claim 16, further comprising computer readable program code for:
    receiving a request to open a virtual folder in the first virtual storage interface;
    determining, from the first document organizational structure, that the virtual folder is a leaf node of the first document organizational structure;
    determining a subset of the plurality of documents in the virtual folder based on the index and the first document organizational structure; and
    presenting a document identifier for each of the plurality of documents in the subset.

19. The non-transitory computer readable medium of claim 16, further comprising computer readable program code for:
    receiving a document for a second accounting workflow;
    detecting a second accounting workflow type of the second accounting workflow, the second accounting workflow type is one of tax return preparation and quarterly report preparation;
    creating an attribute value set based on the second accounting workflow type; and
    storing the attribute value set with a document identifier of the document in the index.

20. The non-transitory computer readable medium of claim 16, further comprising computer readable program code for:
    receiving a second request for the plurality of documents;
    detecting a second accounting workflow type corresponding to the second request;
    identifying a second document organizational structure matching the second accounting workflow type;
    building a second virtual storage interface using the index on the plurality of documents and according to the second document organizational structure; and
    presenting the second virtual storage interface.

* * * * *